Nov. 11, 1952 A. F. REKART 2,617,923

RADIO BROADCASTING SYSTEM WITH SELECTIVE PROGRAM ELIMINATION

Filed Aug. 31, 1949 2 SHEETS—SHEET 1

Arthur F. Rekart, Inventor.

Haynes and Koenig, Attorneys.

Nov. 11, 1952

Filed Aug. 31, 1949

A. F. REKART

RADIO BROADCASTING SYSTEM WITH SELECTIVE PROGRAM ELIMINATION 2,617,923

2 SHEETS—SHEET 2

Arthur F. Rekart, Inventor.

Haynes and Koenig, Attorneys.

Patented Nov. 11, 1952

2,617,923

UNITED STATES PATENT OFFICE 2,617,923

RADIO BROADCASTING SYSTEM WITH SELECTIVE PROGRAM ELIMINATION

Arthur F. Rekart, Ferguson, Mo., assignor to KXOK, Inc., a corporation of Missouri Application August 31, 1949, Serial No. 113,359

5 Claims. (Cl. 250—6)

This invention relates to radio broadcasting and receiving, and more particularly, to a system for temporarily silencing selected receivers during the broadcast of a radio program.

The invention, in general, comprises broadcasting a non-predistorted inaudible control signal during transmission of entertainment, such as music or the like, receiving the control signal at selected receivers and employing it to connect and maintain connected, an otherwise disconnected audio circuit. During broadcast of announcement or the like, transmission of the control signal is discontinued whereupon the audio circuit of the selected receivers is disconnected.

The radio public under certain circumstances objects to the distracting advertising announcements which are included in many radio programs. Edwin H. Armstrong (United States Patent No. 1,941,067) suggested transmitting a subaudible signal with the unwanted program portions, which signal was employed to disconnect the receiver's audio circuit. This system was not entirely satisfactory because it embodied certain defects which were especially troublesome in a commercial installation. When his system developed a fault, it generally led to reproduction of the undesired announcements. For example, a drop in line voltage at the receiver would tend to render the signal detecting means inoperative so that the speaker would not be silenced at the desired times. Such faulty reception can be embarrassing where a fee is charged against a receiver using the service. It can be especially objectionable where the service is sold to a commercial establishment, such as a hotel.

J. B. Caraway, Jr., in United States Patent No. 2,321,651 describes a somewhat similar system for frequency modulation broadcasting. However, it is an alarm system and has certain defects which make it unsatisfactory for the purposes contemplated herein.

The present invention under all circumstances positively insures against reproduction of unwanted portions of a radio program. This is accomplished by rendering the receiver operative only when the control signal is properly initiated and properly received. If because of a fault, the signal is not properly received, the receiver is entirely silenced and thereby cannot cause the embarrassment of having announcements come through. By feeding the control signal directly to an amplifier without preemphasis, the system also eliminates certain problems which previously arose in connection with gain reduction or peak limiting type amplifiers commonly employed in commercial broadcasting. Other features will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of the application of which will be indicated in the following claims.

Figure 1:
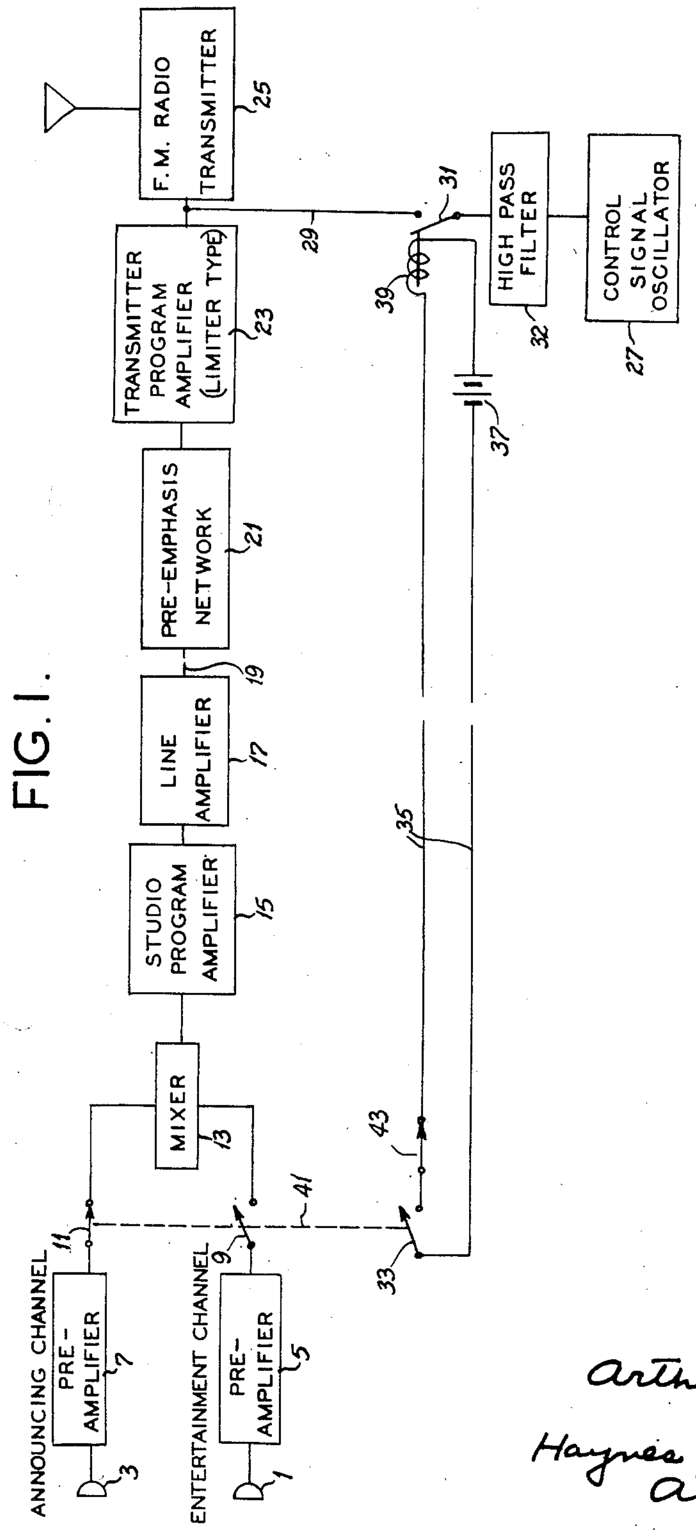
Figure 2:
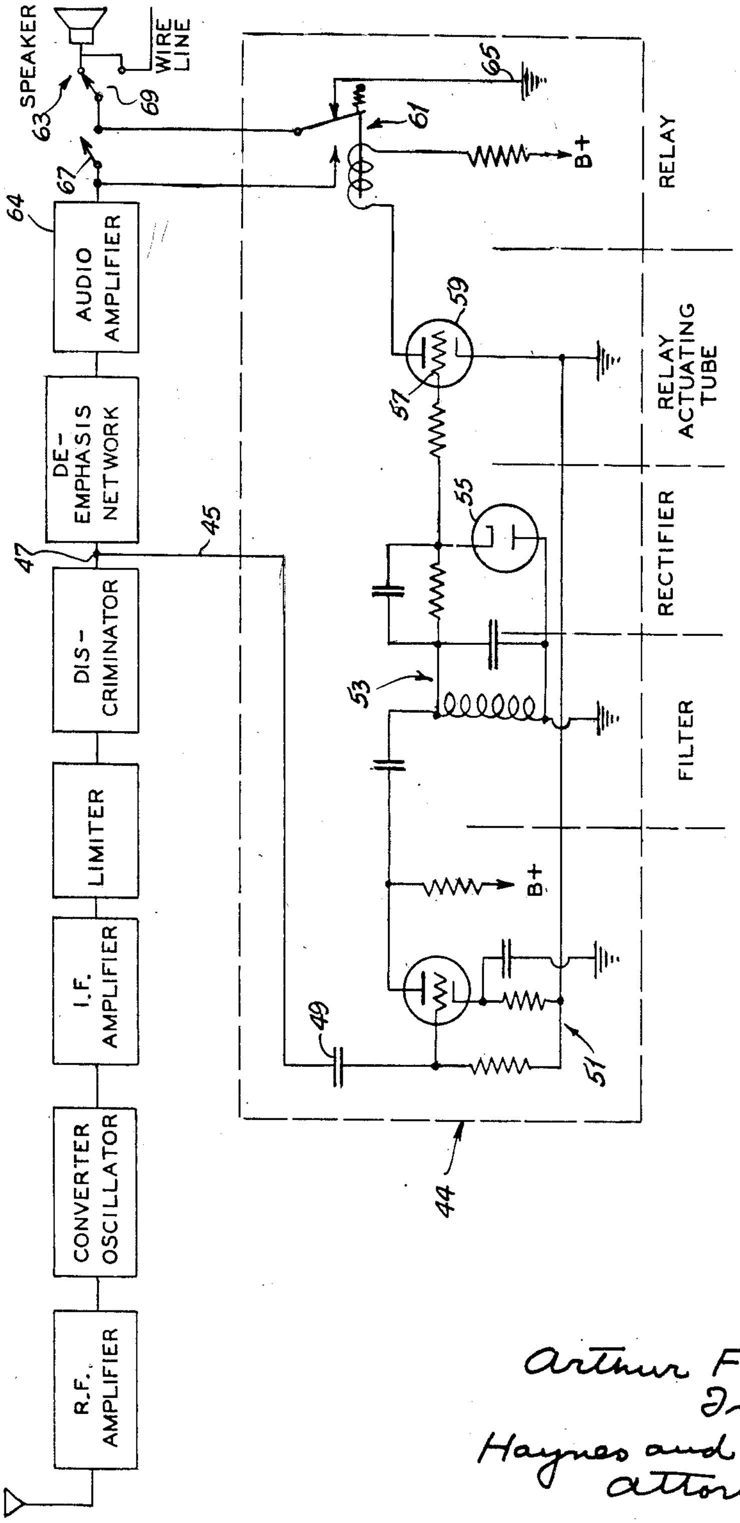

In the accompanying drawings, in which one of various possible embodiments of the invention is illustrated, Fig. 1 is a diagram of a broadcasting station equipped for carrying out the invention; and, Fig. 2 is a diagram of a receiver equipped for carrying out the invention.

Referring to Fig. 1, there is shown a conventional frequency modulation radio broadcasting station which is further adapted for transmission of a control signal during predetermined portions of the program. A microphone 1, herein designated the entertainment channel, is provided for production of the wanted portions of the program. It will be understood that a phonograph or the like may be employed in connection with the channel. A second microphone 3, herein designated the announcing channel, is provided for production of the unwanted portions of the program which are to be rendered inaudible at selected special receivers.

Preamplifiers 5 and 7 for the respective microphones 1 and 3 feed through switches 9 and 11 respectively to a conventional mixer 13. The mixer is followed by a conventional studio program amplifier 15, a conventional line amplifier 17, a telephone line 19 (in case the studio is some distance from the transmitter), a conventional preemphasis network 21, a limiter type transmitter program amplifier 23 and a conventional frequency modulation transmitter 25. The limiter type amplifier 23 includes a peak limiting circuit or gain reduction circuit which limits amplitude to prevent overmodulation in the transmitter. It is a conventional part of commercial broadcasting stations.

The control signal is supplied by an oscillator 27 adapted to generate a super-audible constant frequency signal, for example of the order of 20 kilocycles. The oscillator is preferably positioned near the radio transmitter 25 to obviate difficulties which might be encountered in sending a high frequency signal over ordinary telephone lines. A lead 29 broken by a remote controlled relay switch 31 connects the oscillator directly to the transmitter after or beyond the limiter type transmitter amplifier 23 and after the preemphasis network 21. This connection is important, for if the oscillator fed into the preemphasis network, there would be considerable reduction in the available volume range. The preemphasis network 21 would tend to "skyrocket" the amplitude of the super-audible signal, which when fed into the limiter amplifier 23, would in turn cause the whole program level to be reduced accordingly. The net result would be a compression of the program to a small percentage of the available pedestal or range of power. A conventional high-pass filter 32 is provided in the oscillator output to prevent it from shunting off portions of the program.

The oscillator 27 is connected into the transmitter by remote controlled relay switch 31 which in turn is under the control of a studio switch 33. Lines 35 complete a circuit from the studio switch, through a battery 37 and the coil 39 of the relay. Switch 33 is operative to cut in the oscillator for entertainment and cut out the oscillator during announcements. Also, it is desirable to provide some safety device for the contingency of broadcasting announcements and entertainment together, as in fadeouts. One method of doing this is by mechanically linking the three switches together as indicated at 41. Thus, switches 9 and 33 are locked open when switch 11 is closed, and vice versa. This may also be accomplished by relays, or by mechanically linking switches 11 and 33 so that one is opened when the other is closed. A manual disconnect switch 43 is opened when it is not desired to employ the system of this invention during broadcasting.

The special receiver shown in Fig. 2 is a conventional frequency modulation receiver further including a control 44 (set off by dotted lines) for temporarily silencing the speaker. A connection 45 is made in the receiver circuit after the discriminator, for example as at point 47 between the discriminator and the deemphasis network. It is better practice to take off the high frequency signal before its attenuation by the deemphasis network. Connection 45 is coupled through a capacitor 49 to an amplifier 51. The capacitance 49 is sufficient to block most of the normal program frequencies and prevent overloading of amplifier 51. The amplifier in turn feeds to a selective filter 53 tuned to the frequency of the control signal. Its response characteristic is sufficiently broad to allow for slight drifting and facilitate adjustment, but it is sufficiently sharp to prevent undesired actuation by noise or the like. A low frequency cut-off filter is not satisfactory since it passes a substantial amount of noise and high notes which may become strong enough to activate the receiver at undesired times.

The filtered output is rectified by a rectifier tube 55 and impressed upon the control grid 57 of a normally substantially non-conductive grid controlled tube 59. Conduction of tube 59 actuates a relay switch 61 which has its relay coil in the plate circuit of the tube. The relay switch 61 in turn makes and breaks the speaker circuit 63. The switch is biased toward an open position wherein the speaker transducer is disconnected from the audio circuit 64 of the receiver and grounded at 65. When the control signal is received, the relay actuating tube conducts and the switch 61 is actuated to a closed position wherein the speaker is connected to the audio circuit of the receiver. A manual switch 67 is shunted around the relay to permit reception of the complete radio program, if desired. Also, a double throw switch 69 is provided for connecting the receiver to a wire line which may include several remotely positioned speakers.

Operation is as follows:

The system is shown as set for production of unwanted program portions, such as announcements. The announcements are reproduced by conventional receivers, but not by selected receivers of the type shown in Fig. 2. No control signal is transmitted, consequently the selected receivers do not receive the same. The receiver relay actuating tube 59 does not conduct and relay 61 is biased to the open position wherein the audio circuit is disconnected. When the wanted portions of the program are produced, the transmitter is switched to the entertainment channel of microphone 1. Switch 11 in the announce channel is opened, switch 9 in the entertainment channel is closed and the studio switch 33 for the remote controlled relay 31 is closed. Oscillator 27 then feeds the inaudible control signal through the relay 31 into the transmitter along with the wanted program after its preemphasis and after the peak limiting means.

The signal responsive control 44 embodied in the silenced receivers receives this signal, amplifies it at 51, filters it at 53 and feeds it to the relay actuating tube 59. The control grid swings positive causing tube 59 to conduct and close relay switch 61. Speaker 63 is then connected into the receiver and rendered operative for reproduction of the wanted program initiated in the entertainment channel. It will be understood the entertainment channel will provide the major portion of the radio program. The announce channel is generally used only for relatively short times.

The invention has primary application in a pure entertainment service, for example music such as might be furnished to a restaurant. In this type of service, reproduction of announcements is objectionable, even in comparatively rare instances of faulty operation. It will be noted herein, that if some fault does occur, for example, the control signal oscillator breaks down, then the restaurant receiver is merely silenced during all portions of the program. While the loss of the entertainment is objectionable to a certain extent, it is much less objectionable than having a commercial announcement disturb the restaurant patrons. Furthermore an interconnected switching system for relating broadcast of the control signal with use of the various microphone channels protects against faulty control at this point. Overmodulation in the transmitter is prevented by introducing the signal after preemphasis and undue volume compression is likewise prevented where peak limiting or compression types of amplifiers are employed. While the invention is described in connection with a sound broadcasting system, it will be understood that the invention can also be used in connection with the video portion of a television broadcast.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings shall be interpreted as illustrative and not in a limiting sense.

I claim:

1. A radio broadcasting system comprising a frequency modulation transmitter, a preemphasis network feeding to said transmitter, an oscillator for generating a constant-frequency super-audible control signal feeding to said transmitter after said preemphasis network, an announce channel and an entertainment channel feeding to said preemphasis network for initiating a radio program, switching means for said channels and for said oscillator and switch interlocking means for effecting transmission of said control signal only during use of said entertainment channel.

2. A radio broadcasting system comprising a frequency modulation transmitter, a peak limiting circuit for preventing overmodulation feeding to said transmitter, a preemphasis network feeding to said peak limiting circuit, an oscillator for generating a constant-frequency super-audible control signal feeding to said transmitter after said peak limiting circuit, an announce channel and an entertainment channel for initiating a radio program feeding to said preemphasis network, and switching means for said channels and for said oscillator.

3. A radio broadcasting system comprising a frequency modulation transmitter, a peak limiting circuit for preventing overmodulation feeding to said transmitter, a preemphasis network feeding to said peak limiting circuit, an oscillator for generating a constant-frequency super-audible control signal feeding to said transmitter after said peak limiting circuit, an announce channel and an entertainment channel for initiating a radio program feeding to said preemphasis network, switching means for said channels and for said oscillator, and switch interlocking means for effecting transmission of the control signal only during use of said entertainment channel.

4. A radio system for use between a broadcasting station and a receiving station, said system comprising in the broadcasting station a frequency modulation transmitter, a preemphasis network feeding to said transmitter, an oscillator for generating a constant-frequency super-audible control signal feeding to said transmitter after said preemphasis network, an announce channel and an entertainment channel feeding to said preemphasis network for initiating a radio program, switching means for said channels and for said oscillator and switch interlocking means for effecting transmission of said control signal only during use of said entertainment channel; and said system comprising in the receiving station a frequency modulation receiver having an audio circuit and a speaker, a grounding disconnecting switch between the audio circuit and the speaker biased to an open-circuit grounding position and a signal responsive control for connecting said speaker by closing said disconnecting switch in response to reception of said control signal.

5. A radio system for use between a broadcasting station and a receiving station, said system comprising in the broadcasting station a frequency modulation transmitter, a preemphasis network feeding to said transmitter, an oscillator for generating a constant-frequency super-audible control signal feeding to said transmitter after said preemphasis network, an announce channel and an entertainment channel feeding to said preemphasis network for initiating a radio program, switching means for said channels and for said oscillator and switch interlocking means for effecting transmission of said control signal only during use of said entertainment channel; and said system comprising in the receiving station a frequency modulation receiver having an audio circuit and a speaker, a disconnecting switch between the audio circuit and the speaker biased to an open-circuit position, and a signal responsive control for connecting said speaker by closing said disconnecting switch in response to reception of said control signal.

ARTHUR F. REKART.

REFERENCES CITED

The following references are of record in the file of this patent:

UNITED STATES PATENTS

| Number | Name | Date |
|---|---|---|
| Re. 21,660 | Armstrong | Dec. 17, 1940 |
| 1,941,067 | Armstrong | Dec. 26, 1933 |
| 2,212,338 | Brown | Aug. 20, 1940 |
| 2,296,919 | Goldstine | Sept. 29, 1942 |
| 2,321,651 | Caraway | June 15, 1943 |
| 2,367,327 | Beers | Jan. 16, 1945 |
| 2,368,778 | Purington | Feb. 6, 1945 |
| 2,392,672 | Koch | Jan. 8, 1946 |
| 2,479,305 | Brown | Aug. 16, 1949 |